Patented June 11, 1935

2,004,686

UNITED STATES PATENT OFFICE 2,004,686

METHOD OF PRODUCING SOUND ABSORBING MATERIAL

Charles Birchy, Atlanta, Ga., assignor of one-half to Samuel D. Hewlett, Atlanta, Ga.

No Drawing. Application April 21, 1933, Serial No. 667,264

10 Claims. (Cl. 25—156)

Generically this invention relates to acoustical materials, but it more especially is directed to such a material of the ceramic type and method of producing same.

It has been difficult if not impossible to produce a ceramic acoustical material without shrinking, twisting, warping, etc., during the drying out and burning process, and that when finished would present the desired porosity and strength to withstand the stresses incident to its operative application to building structures. Therefore one of the principal objects of this invention is the provision of a method for producing acoustical ceramic materials without shrinking, twisting, warping, etc., occurring during the drying, burning or other process in course of producing the finished article.

An important object of this invention is the provision of a method of producing a porous ceramic material wherein the necessity of any added substance such as vegetable matter to be destroyed during the burning process to provide porosity is eliminated, and wherein the porosity of the finished material may be provided and controlled or varied dependent upon the amount of sound absorption desired at various cycles of frequency.

A further important object of this invention is the provision of a method of producing a ceramic acoustical material and various colors and lustres, and for controlling the finished product as desired.

A still further important object of this invention is the provision of a method of producing an acoustical material from particles of a body substance bonded at their limited points of contact to form pores and molded and baked to form a ceramic material, the amount of sound absorption depending upon the formation and sizes of said particles.

Briefly, this invention comprehends a method by which acoustical ceramic products can be manufactured in various colors and finishes without shrinking and warping, which occurs generally in all clay wares during burning in a kiln under high temperatures, and further providing a body material of great porosity wherein the pores are formed by constructing said body material from particles of said material bonded at their limited points of contact by an adhesive glaze substance or by the inherent properties of the particles, without depending upon the use of any added substance, such as vegetable matter, adapted to be destroyed during the burning process to give porosity.

The selection of materials from which are manufactured the acoustical ceramic products forming the subject matter of this invention is not confined to certain clays or shales for the body material, since it has been developed that the body material can be composed of clays, shales, fuller's earth, pumice stone, and mineral oxide colors in various combinations and proportions depending on the hardness, weight and color desired after burning.

When the proper body material has been selected, and where the finished product is to be colored, mineral coloring is added and the material is then thoroughly pulverized and reduced to a powder. Sufficient water is then added to effect a workable consistency and the mass is thoroughly kneaded or pugged into wads of convenient sizes.

The wads thus formed are allowed to dry and harden to the proper consistency, either under normal atmospheric conditions or in dryer ovens through which hot air or steam is circulated, and are then grated or shredded into particles, flakes, chips, or shreds of sizes suitable to obtain the results required. These sizes vary depending on the amount of sound absorption desired at various cycles of frequency.

The flakes, chips or shreds are again dried as above outlined, this time until all moisture has been eliminated, and are then placed in kilns and burnt at temperatures usually up to 2000 degrees Fahrenheit or whatever heat is required to render them hard enough to produce a suitable body material and presenting the proper color, and which depends upon the nature of the clays, shales and other materials used. However, generally a hardness approximating that of hard burnt brick or terra cotta has proven satisfactory.

The next step is to prepare the bonding material or adhesive glaze substance. This material or substance is compounded from various chemicals with sufficient gum arabic or dextrine or both added to make it sufficiently adhesive to hold the flakes, chips or shreds together when being molded so that the various shapes thus formed can be handled and carried into the kilns for burning.

While it may be found expedient to vary the formula for the adhesive glaze substance in accordance with different types of body materials, colors desired and requirements as to the finished product, yet in connection with certain types of body material, the following formula has proven satisfactory.

| | Parts |
|---|---|
| Flint glass | 10 |
| Feldspar | 70 |
| Zinc oxide | 10 |
| China clay | 4 |
| Ball clay | 4 |
| Calcium carb | 20 |
| Silica | 10 |
| Oxide tin | 8 |

The mixture composed of the above ingredients produces a white glaze when subjected to the proper heat, and if colors are desired, oxide of cobalt may be added for blue, oxide of chrome for green, etc. This mixture is then mixed with water and sufficient gum arabic or dextrine to effect the proper adhesive quality, and at a consistency of thick cream is ground in a ball mill sufficiently to eliminate any gritty feeling when rubbed between the fingers.

The object of using an adhesive glaze material is to temporarily hold the burnt particles together while in the process of being molded into the desired shapes or blocks, and further, the composition of the adhesive glaze material is such that it is converted into a glass-like substance under heat, causing the particles to be securely bonded together at their limited points of contact when the molded mass is subjected to the burning operation in the kiln. Uniting the particles at their limited points of contact forms a plurality or myriad of intercommunicating channels or pores openly penetrating the surfaces of said material, thereby forming a cellular or porous ceramic sound absorbing material.

The burned chips, flakes, or shreds are now mixed with the adhesive glaze material, or in other words, they are coated with the adhesive substance and the entire mass is then pressed into molds of the desired shapes. After the pieces or shapes are removed from the molds they are allowed to dry either naturally or in drier ovens as desired. In course of drying the adhesive glaze material becomes sufficiently hard to securely hold the chips or particles of the body material in the shapes or forms in which they have been molded so they can be handled or carried into the kilns for final burning.

In the final burning the molded pieces or shapes are placed in the kilns or ovens in large mufflers or saggers which protect the material from the gases and ashes which usually penetrate the ovens or kilns discoloring or staining whatever objects they contact. In burning the material or molded forms the heat is raised slowly by degrees until the temperature at which the glaze matures is reached, which may be 1800 degrees Fahrenheit, and which operation may require from three days to a week, depending on the size of the oven or kiln, type of fuel used, number of fire boxes, etc.

In the said second or final burning operation the adhesive glaze substance is adapted to mature at a lower heat than that used to produce the flakes, chips, or shreds. The flakes, chips, or shreds having been first burnt at two thousand degrees F., the adhesive glaze formula is prepared so as to mature at a much lower temperature, or at about 1800 degrees F. when the molded forms are subjected to the final burning operation.

By burning the chips, shreds, or flakes at a high temperature an inert material is obtained that is not subject to expansion, contracting, warping, or twisting in course of or when bonded together by the adhesive glaze substance at the lower temperature of the second burning operation.

While preferably it has been found expedient to use the glaze material for initially and temporarily holding the burned chips, flakes, or shreds together during the molding operation, yet it has also been found that certain clays can be thoroughly kneaded and while still damp, grated or shredded directly into the molds, such particles having sufficient inherent adhesive qualities to adhere at their limited points of contact and hold together during the drying and burning processes without the use of an adhesive or an adhesive glaze material and without the necessity of mixing any flux of any kind with the clays themselves.

It is difficult to give exact proportions of the materials used as these will vary depending upon the nature of the raw materials used to form the chips, flakes, or shreds of the body material. Also by employing body materials of different densities and varying the heat treatments, the weight of the finished product may be controlled.

From the above it will be apparent that I have provided a method of producing ceramic acoustical materials wherein shrinking, warping, and twisting is eliminated; porosity controlled to vary the degrees of sound absorption as desired; producing the finished article in various colors and lusters, and controlling the weight of the finished product as desired.

Having thus described my invention, what I desire protected by Letters Patent is as set forth in the following claims:

1. A method of producing a ceramic acoustical material consisting in reducing a body material to particles, subjecting said particles to a burning operation, then coating said particles with a fusible adhesive substance, then to a molding operation, and then subjecting said molded mass to a burning operation, whereby a porous sound absorbing material is effected.

2. A method of producing a ceramic acoustical material consisting in reducing a body material to particles, subjecting the particles to a burning operation, coating said particles with an adhesive substance, then subjecting the coated particles to a molding operation, and then to a burning operation, whereby a porous sound absorbing material is effected.

3. A method of producing a ceramic acoustical material consisting in reducing a body material to particles, subjecting said particles to the action of heat at a predetermined temperature, coating said particles with an adhesive substance, then molding said particles into a definite shape, and subjecting said molded shape to the action of heat at a predetermined temperature, whereby a porous sound absorbing material is effected.

4. A method of producing a ceramic acoustical material consisting in reducing a body material to predeterminedly sized particles, subjecting said particles to the treatment of heat at a predetermined temperature, coating the particles with an adhesive substance adapted to fuse at a predetermined temperature, then molding the mass of particles into a definite shape, and subjecting said molded shape to the action of heat at a temperature corresponding to the fusible temperature of said adhesive substance, whereby a ceramic material of predetermined porosity and sound absorbing quality is effected.

5. A method of producing a ceramic acoustical material consisting in subjecting particles of a body material to the action of heat at a predetermined temperature, then to a coating treatment with an adhesive substance, then molding said particles into the desired shape, then subjecting said molded shape to the action of heat at a predetermined temperature, whereby a porous sound absorbing inert material impervious to expansion and contraction is effected.

6. A method of producing a ceramic acoustical material consisting in treating a body material with a coloring agent, reducing said body material to particles, subjecting said particles to the action of heat at a temperature adapted to render them inert and impervious to expansion and contraction under further heat treatment, coating said particles with an adhesive substance, subjecting the coated mass to a molding operation, and then to a baking operation, whereby a porous sound absorbing material of a prescribed color is effected.

7. A method of producing a ceramic acoustical material consisting in reducing a body material to predeterminedly sized particles, subjecting said particles to a temperature of approximately 2000° F., coating said particles with a fusible adhesive substance, then molding the particles into a predeterminedly shaped piece, and subjecting said piece to a temperature of approximately 1800° F., whereby an inert material of predetermined porosity and sound absorbing value is effected.

8. A method of producing a ceramic acoustical material consisting in reducing a body material to predeterminedly sized particles, subjecting said particles to a predetermined temperature, coating said particles with an adhesive fusible glaze substance adapted to bond said particles together at their limited points of contact, molding said particles into a definitely shaped piece, then subjecting said piece to a temperature sufficient to melt said glaze substance to effect a glazed union between the particles at said points of contact, whereby a material of predetermined porosity and definite sound absorbing quality is effected.

9. A method of producing a ceramic sound absorbing material consisting in treating a body material with a coloring agent, forming said material into a semi-plastic, reducing said semi-plastic mass into particles having irregular dimensions, then drying the particles, subjecting said particles to a predetermined temperature, coating the particles with an adhesive fusible glaze substance, then molding said particles under pressure into a definitely shaped piece, and subjecting said piece to a temperature sufficient to melt said glaze substance, whereby a sound absorbing material formed from particles of said material united at their limited points of contact by glaze-like bonds is effected.

10. A method of producing a ceramic acoustical material consisting in subjecting particles of a body material to the action of heat at a predetermined temperature, then to a coating treatment with an adhesive, then molding said particles into the desired shape, then placing said shape within a protective covering, then subjecting said shape to the action of heat at a predetermined temperature, whereby discolorization of said shape during said heat treatment is prevented and a porous sound absorbing material is effected.

CHARLES BIRCHY.